United States Patent
Hiwale et al.

(10) Patent No.: US 9,659,109 B2
(45) Date of Patent: May 23, 2017

(54) SYSTEM AND METHOD FOR QUERY AUTO-COMPLETION USING A DATA STRUCTURE WITH TRIE AND TERNARY QUERY NODES

(71) Applicant: Wal-Mart Stores, Inc., Bentonville, AR (US)

(72) Inventors: Rohit Hiwale, Bangalore (IN); Vishwas Goel, Bangalore (IN)

(73) Assignee: WAL-MART STORES, INC., Bentonville, AR (US)

( * ) Notice: Subject to any disclaimer, the term of this patent is extended or adjusted under 35 U.S.C. 154(b) by 319 days.

(21) Appl. No.: 14/289,495

(22) Filed: May 28, 2014

(65) Prior Publication Data

US 2015/0347436 A1 Dec. 3, 2015

Related U.S. Application Data

(60) Provisional application No. 62/003,406, filed on May 27, 2014.

(51) Int. Cl.
*G06F 7/00* (2006.01)
*G06F 17/30* (2006.01)

(52) U.S. Cl.
CPC .............................. *G06F 17/3097* (2013.01)

(58) Field of Classification Search
CPC ................................................... G06F 17/3097
USPC ....................................................... 707/706
See application file for complete search history.

(56) References Cited

U.S. PATENT DOCUMENTS

| 5,495,609 | A | * | 2/1996 | Scott | G06F 17/30327 |
| | | | | | 707/696 |
| 5,963,940 | A | * | 10/1999 | Liddy | G06F 17/30654 |
| 6,029,195 | A | * | 2/2000 | Herz | G06F 17/30867 |
| | | | | | 348/E7.056 |
| 6,263,333 | B1 | * | 7/2001 | Houchin | G06F 17/27 |
| 6,401,084 | B1 | * | 6/2002 | Ortega | G06F 17/2725 |
| | | | | | 704/5 |
| 6,480,838 | B1 | * | 11/2002 | Peterman | G06K 9/00865 |
| 6,564,213 | B1 | * | 5/2003 | Ortega | G06F 17/3064 |

(Continued)

OTHER PUBLICATIONS

Sedgewick et al., "Algorithms", 4th edition, 2011, pp. 750-751 (entire book provided).*

(Continued)

*Primary Examiner* — Tony Mahmoudi
*Assistant Examiner* — Michael Le
(74) *Attorney, Agent, or Firm* — Bryan Cave LLP

(57) ABSTRACT

A method of providing predictive search query recommendations for a search query. The method can be implemented via execution of computer instructions configured to run at one or more processing modules and configured to be stored at one or more non-transitory memory storage modules. The method can include receiving the search query from a user. The method also can include determining the predictive search query recommendations for the search query using a tree data structure. At least one top layer of the tree data structure can include at least one trie query node and bottom layers of the tree data structure can include ternary tree query nodes. The method further can include sending the predictive search query recommendations to the user. Other embodiments of related systems and methods are also disclosed.

20 Claims, 8 Drawing Sheets

(56) References Cited

U.S. PATENT DOCUMENTS

| | | | |
|---|---|---|---|
| 7,406,462 B2* | 7/2008 | Carmel | G06F 17/30864 707/706 |
| 7,499,940 B1 | 3/2009 | Gibbs | |
| 7,644,054 B2* | 1/2010 | Garg | G06F 3/0236 706/46 |
| 7,797,298 B2 | 9/2010 | Sareen et al. | |
| 7,836,044 B2 | 11/2010 | Kamvar et al. | |
| 7,957,955 B2 | 6/2011 | Christie et al. | |
| 8,027,974 B2 | 9/2011 | Gibbs | |
| 8,074,172 B2 | 12/2011 | Kocienda et al. | |
| 8,156,109 B2 | 4/2012 | Kamvar et al. | |
| 8,271,471 B1 | 9/2012 | Kamvar et al. | |
| 8,271,546 B2 | 9/2012 | Gibbs | |
| 8,452,745 B2 | 5/2013 | Ramakrishna | |
| 8,499,940 B2* | 8/2013 | Johnson | A47F 5/025 211/1.53 |
| 8,515,954 B2 | 8/2013 | Gibbs et al. | |
| 8,521,725 B1 | 8/2013 | Pearson et al. | |
| 8,694,512 B1* | 4/2014 | Zhdanovich | G06F 17/3064 707/748 |
| 2003/0130994 A1* | 7/2003 | Singh | G06F 17/30867 |
| 2003/0204515 A1* | 10/2003 | Shadmon | G06F 17/3061 |
| 2004/0083092 A1* | 4/2004 | Valles | G06F 17/2785 704/9 |
| 2006/0020591 A1* | 1/2006 | Kommers | G06F 17/3097 |
| 2007/0061247 A1* | 3/2007 | Ramer | G06F 17/3097 705/37 |
| 2007/0168469 A1* | 7/2007 | Church | G06F 17/273 709/219 |
| 2008/0091670 A1* | 4/2008 | Ismalon | G06F 17/3064 |
| 2008/0270379 A1* | 10/2008 | Ramakrishna | G06F 17/30864 |
| 2010/0169341 A1* | 7/2010 | Hu | G06F 17/3064 707/758 |
| 2010/0325136 A1* | 12/2010 | Chaudhuri | G06F 17/276 707/759 |
| 2013/0066896 A1* | 3/2013 | Mehanna | G06F 17/30395 707/767 |
| 2013/0179419 A1* | 7/2013 | Hsu | G06F 17/30327 707/706 |
| 2014/0136543 A1* | 5/2014 | Frieden | G06F 17/3097 707/741 |

OTHER PUBLICATIONS

Henderson, "Ternary Search Tries for Fast Flexible String Search: Part 1", Hackthology, Jun. 2, 2011, 7 pages.*

An O(k log n) algorithm for prefix based ranked autocomplete, Dhruv Matani, Sep. 2, 2011.

Some thoughts on your (and my) thoughts.: A very fast approach to auto complete (or search suggestions), Dhruv Matani, http://dhruvbird.blogspot.com/2010/09/very-fast-approach-to-search.html, Sep. 15, 2010.

Putting Autocomplete Data Structures to the Test, Steve Daskam, http://stevedaskam.wordpress.com/2009/06/07/putting-autocomplete-data-structure-to-the-test/, Jun. 7, 2009.

Suggest Tree: A Data Structure for Efficient Autocomplete, http://suggesttree.sourceforge.net/, May 10, 2014.

Query Suggestions in the Absence of Query Logs, Sumit Bhatia; Debapriyo Majumdar; Prasenjit Mitra, SIGIR '11, Jul. 24-28, 2011.

Learning to Personalize Query Auto-Completion, Milad Shokouhi, SIGIR '13, Jul. 28-Aug. 1, 2013.

Ternary Search Tree GeeksforGeeks, http://www.geeksforgeeks.org/ternary-search-tree/, May 15, 2014.

Efficient auto-complete with a ternary search tree, http://igoro.com/archive/efficient-auto-complete-with-a-ternary-search-tree/, Aug. 30, 2009.

* cited by examiner

SYSTEM AND METHOD FOR QUERY AUTO-COMPLETION USING A DATA STRUCTURE WITH TRIE AND TERNARY QUERY NODES

CROSS-REFERENCE TO RELATED APPLICATIONS

This application claims the benefit of U.S. Provisional Application No. 62/003,406, filed May 27, 2014. U.S. Provisional Application No. 62/003,406 is incorporated herein by reference in its entirety.

TECHNICAL FIELD

This disclosure relates generally to searching in a computer network system, and relates more particularly to providing predictive search recommendations.

BACKGROUND

Many websites that provide search functionality also provide an auto-completion functionality for search queries. When a user begins to type a search query in a search box, the auto-completion functionality allows users to see a list of suggested search queries, which can eliminate the need to type in the full search query, and/or can show the user how to form improved search queries. A challenge in implementing the auto-completion functionality is to provide the suggested search queries fast enough to deliver suggestions while the user is typing and before the user finishes typing the search query. When the scope of the search engine is broad, with very large numbers of possible queries and search suggestions, the challenge of implementing the auto-completion functionality in a rapid manner can become difficult. In many conventional implementations of auto-completion, adding new search queries and solutions further slows the system.

One common approach to implementing auto-completion is to use a trie data structure. Using a trie data structure for the full set of alphanumeric characters, however, results in rapid fan-out at each level of the tree, and is thus very memory intensive. Additionally, the trie data structure wastes a significant amount of memory, as many of the alphanumeric characters are not used at many of the nodes of the trie data structure. Pre-caching the trie data structure can use a huge amount of memory. Another common approach to implementing auto-completion is to use a ternary tree data structure. Performing auto-completion using a ternary tree data structure consumes less memory, but is significantly slower than using a trie data structure. A challenge is to implement auto-completion in a way that is both fast and memory efficient.

BRIEF DESCRIPTION OF THE DRAWINGS

To facilitate further description of the embodiments, the following drawings are provided in which.

Figure 1:
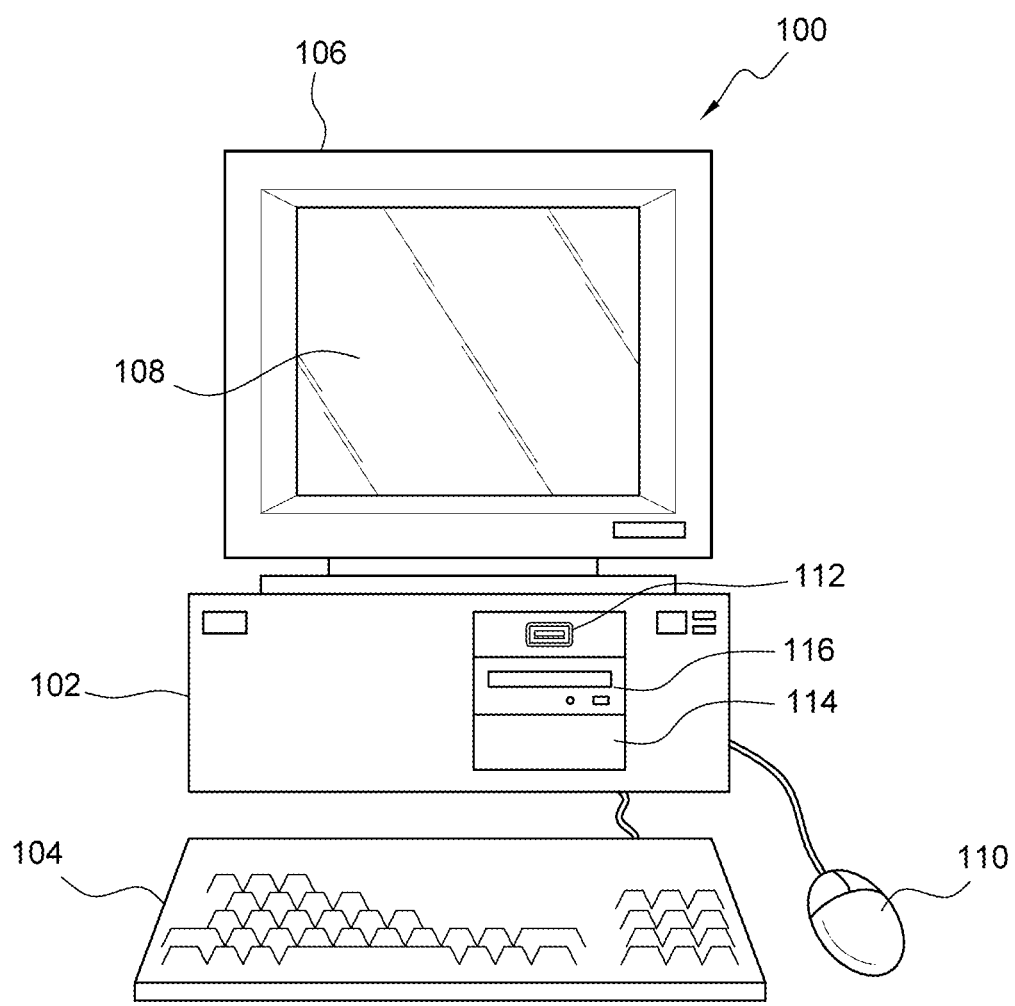
FIG. 1 illustrates a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments include a method of providing predictive search query recommendations for a search query. The method can be implemented via execution of computer instructions configured to run at one or more processing modules and configured to be stored at one or more non-transitory memory storage modules. The method can include receiving the search query from a user. The method also can include determining the predictive search query recommendations for the search query using a tree data structure. At least one top layer of the tree data structure can include at least one trie query node and bottom layers of the tree data structure can include ternary tree query nodes. The method further can include sending the predictive search query recommendations to the user.

Various embodiments include a system for providing predictive search query recommendations for a search query. The system can include one or more processing modules and one or more non-transitory memory storage modules storing computing instructions configured to run on the one or more processing modules. The computing instructions can perform the act of receiving the search query from a user. The computing instructions also can perform the act of determining the predictive search query recommendations for the search query using a tree data structure. At least one top layer of the tree data structure can include at least one trie query node and bottom layers of the tree data structure can include ternary tree query nodes. The computing instruction further can include sending the predictive search query recommendations to the user.

Embodiments include a smart, very fast, and/or memory efficient query auto completion system. In various embodiments, search query auto-completion can be implemented using a mix of trie and ternary trees. Trie nodes can be used at the first few levels where the fan out is much higher and ternary tree nodes can be used for other lower levels. Using trie nodes for the top layers can be very fast at those layers, providing speed.

Figure 2:
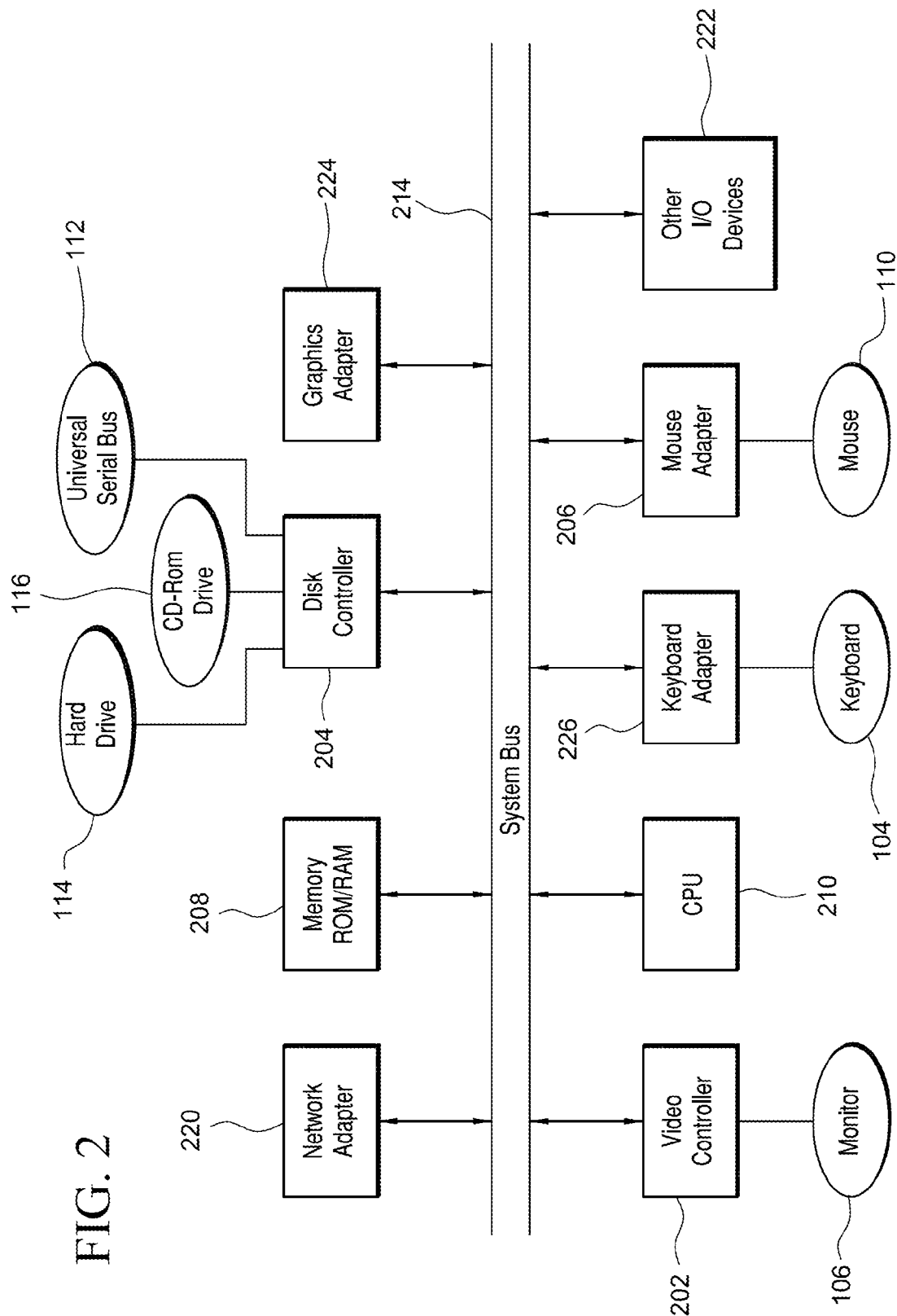
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
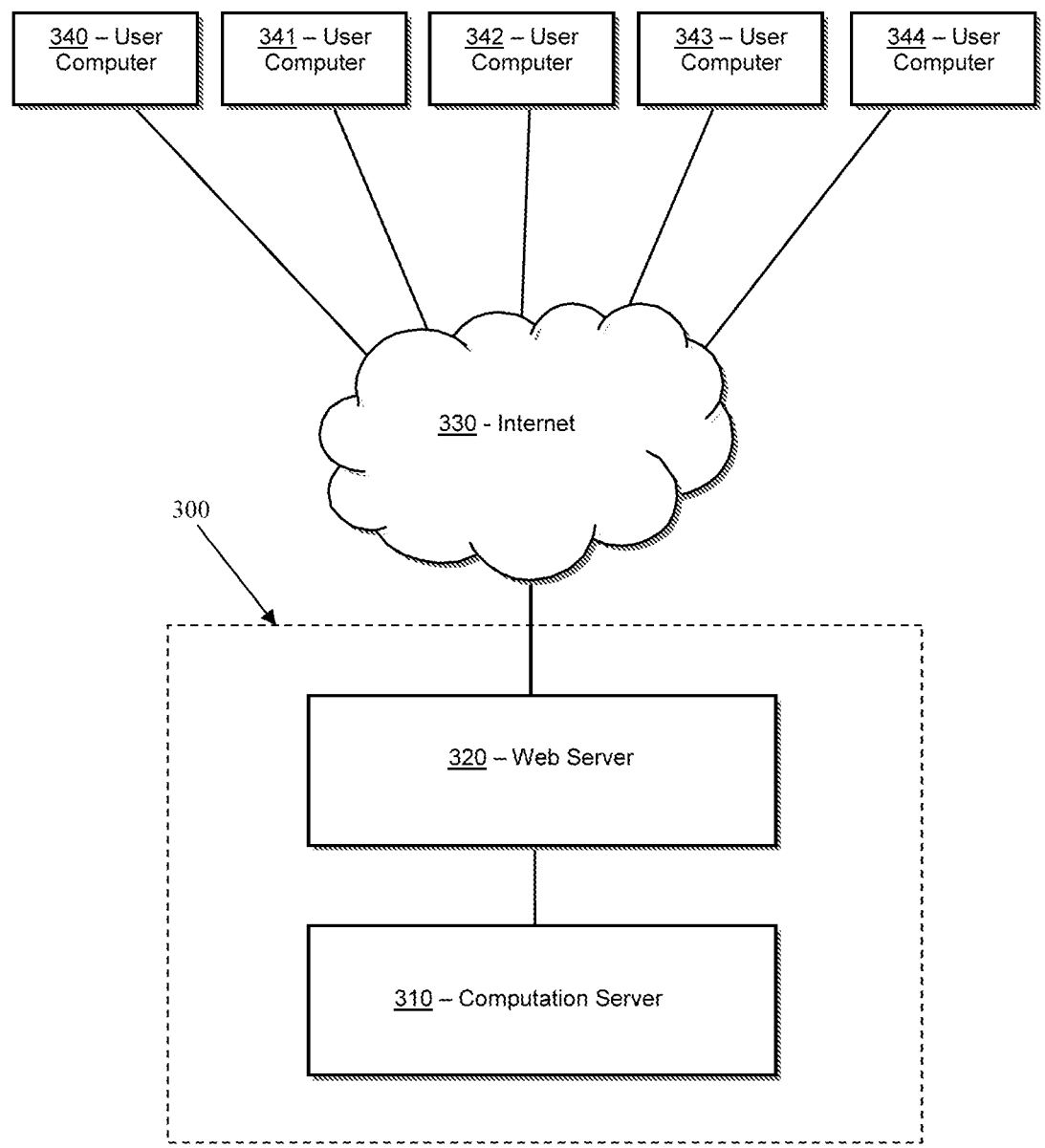
FIG. 3 illustrates a block diagram of an example of a system that can be employed for query auto-completion, according to an embodiment.

Turning ahead in the drawings, FIG. 3 illustrates a block diagram of a system 300 that can be employed for query auto-completion, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300. In some embodiments, system 300 can include a computation server 310 and/or a web server 320. Each of web server 320 and/or computation server 310 can be a computer system, such as computer system 100 (FIG. 1), as described above, and can each be a single computer, a single server, or a cluster or collection of computers or servers, or a cloud of computers or servers. Additional details regarding computation server 310 and web server 320 are described below.

In some embodiments, web server 320 can be in data communication through Internet 330 with user computers (e.g., 340, 341, 342, 342, 344). In certain embodiments, user computers 340-344 can be desktop computers, laptop computers, smart phones, tablet devices, and/or other endpoint devices. Web server 320 can host one or more websites. For example, web server 320 can host an eCommerce web site that allows users to browse and/or search for items, to add items to an electronic shopping cart, and/or to purchase items, in addition to other suitable activities. In various embodiments, a user can use a user computer (e.g., 340-344) to search for items by typing a search query in a search box (e.g., search box 510 (FIG. 5, described below) or search box 610 (FIG. 6, described below)) on a web page (e.g., web page 500 (FIG. 5, described below) or web page 600 (FIG. 6, described below)), and web server 320 can receive the search query entered in the search box from the user.

In many embodiments, after receiving the search query, web server 320 and/or computation server 310 can provide auto-completion functionality by determining predictive search query recommendations to send to the user. Determining the predictive search query recommendations can be performed using a tree data structure, which can have trie query nodes at top layers of the tree data structure and ternary tree query nodes at bottom layers of the tree data structure.

Figure 4:
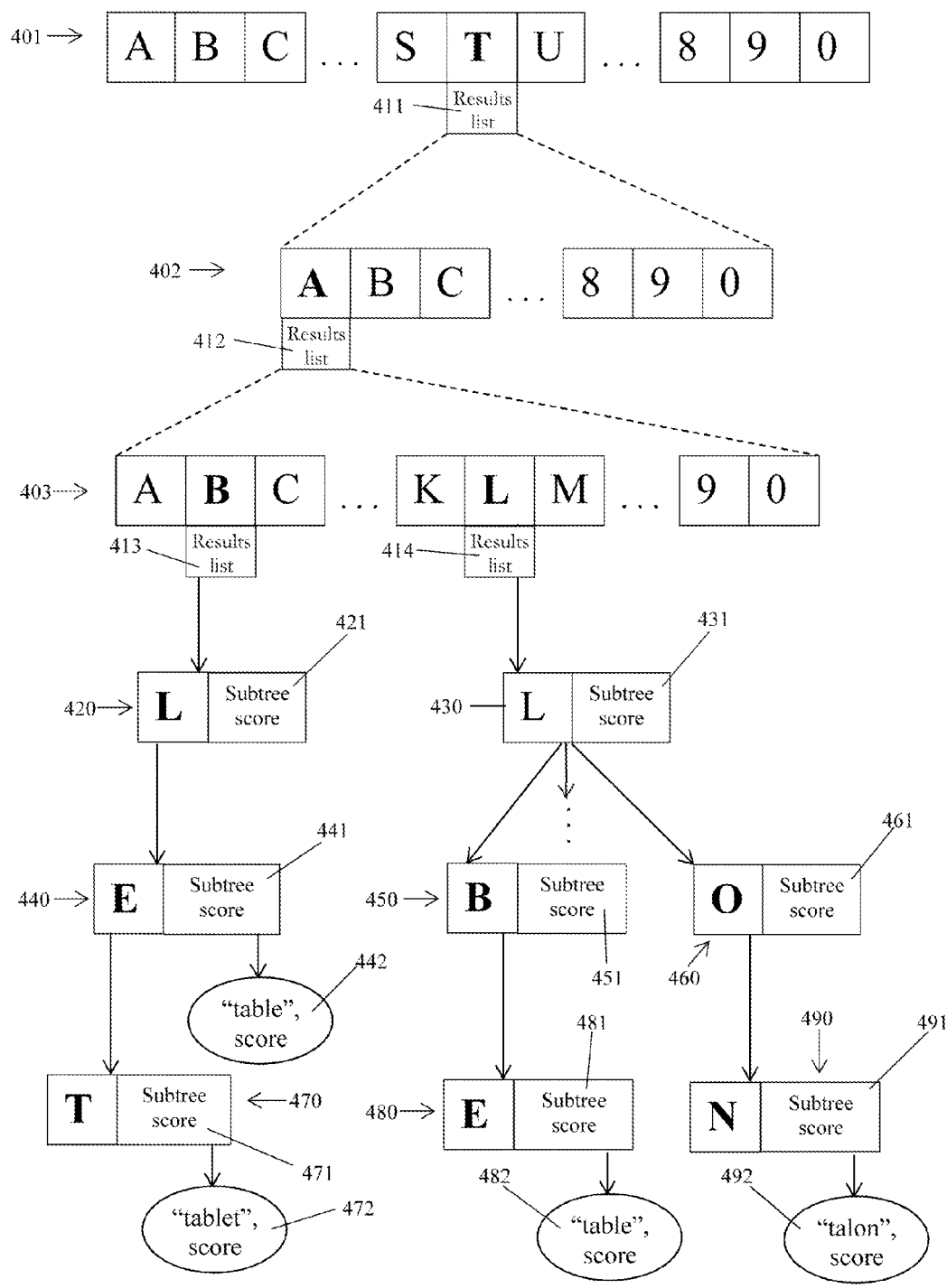
FIG. 4 illustrates a portion of an exemplary tree data structure that can be used for query auto-completion, according to another embodiment.

Turning ahead in the drawings, FIG. 4 illustrates a portion of an exemplary tree data structure 400 that can be used for query auto-completion, according to an embodiment. Tree data structure 400 can include a mix of trie query nodes and ternary tree query nodes. For example, tree data structure 400 can include trie query nodes, such as trie query nodes 401, 402, and 403, and can include ternary tree query nodes, such as ternary tree query nodes 420, 430, 440, 450, 460, 470, 480, and 490. In many embodiments, each trie query node (e.g., 401, 402, 403) can include an indexed array of characters that can be included in a search query, such as alphanumeric characters. In a number of embodiments, each ternary tree query node (e.g., 420, 430, 440, 450, 460, 470, 480, 490) can include a single character that can be included in a search query. In many embodiments, the trie query nodes, such as trie query nodes 401, 402, and 403 can be at the top layers of tree data structure 400. As shown in FIG. 4, the tree query nodes (e.g., 401, 402, 403) are at the top three layers of tree data structure 400. In various embodiments, the trie query nodes (e.g., 401, 402, 403) can be the top one, two, three, four, five, six, seven, eight, or more layers of tree data structure 400. In a number of embodiments, the top layers of tree data structure 400 that include the trie query nodes (e.g., 401, 402, 403) do not include any ternary tree query nodes (e.g., 420, 430, 440, 450, 460, 470, 480, 490).

The ternary tree query nodes (e.g., 420, 430, 440, 450, 460, 470, 480, 490) can be at the bottom layers of tree data structure below the trie query nodes (e.g., 401, 402, 403). The number of total layers of the ternary tree query nodes (e.g., 420, 430, 440, 450, 460, 470, 480, 490) can be data dependent and/or dynamic based on the amount of queries included, and can occupy many bottom layers of tree data structure 400, such as 40, 50, or even 100 or more bottom layers. In many embodiments, the bottom layers of tree data structure 400 that include ternary tree query nodes (e.g., 420, 430, 440, 450, 460, 470, 480, 490) do not include any trie query nodes (e.g., 401, 402, 403). In some embodiments, the number of layer of each type of query node (i.e., trie query node or ternary tree query node) can be tuned based on the amount of data and/or the amount of available memory.

In many embodiments, query auto-completion can determine and send to the user a limited number of predictive search query recommendations for the search query. In various embodiments, the number of predictive search query recommendations sent to the user can be capped at a maximum number, such as 5 or 10, or another suitable number. As an example, a user can search for "iph," and the predictive search query recommendations can include "iphone," "iphone 5," "iphone 5s," and "iphone 5c," and "iphone charger." In many embodiments, each of the predictive search query recommendations can be included in a database of predictive query solutions. Each solution can have a score, which indicates its relevance, and can be based on textual matching of product titles and/or product attributes, popular search queries, products with high demand, products with high supply, and/or other suitable factors.

The tree data structure can include query nodes, such as trie query nodes (e.g., 401, 402, 403) and the ternary tree query nodes (e.g., 420, 430, 440, 450, 460, 470, 480, 490), and can include solution nodes, such as solution nodes, 442, 472, 482, and 492. In many embodiments, the solution nodes (e.g., 442, 472, 482, 492) can be leaf nodes of tree data structure 400. In a number of embodiments, the solution nodes (e.g., 442, 472, 482, 492) can include a predictive query solution, such as from the database of predictive query solutions, and a score. As described above, the score can represent the relevance of the predictive query solution in the same solution node (e.g., 442, 472, 482, 492) as the score. For example, solution node 442 can include the predictive query solution of "table," which can have a score based on the relevance of the search query "table."

In certain embodiments, the solution nodes (e.g., 442, 472, 482, 492) can be child nodes only of the ternary tree query nodes (e.g., 420, 430, 440, 450, 460, 470, 480, 490) and not the trie query nodes (e.g., 401, 402, 403). As shown in FIG. 4, solution nodes 442, 472, 482, and 492 are child nodes only of ternary tree query nodes, specifically ternary tree query nodes 440, 470, 480, and 490, respectively. In other embodiments, the solution nodes (e.g., 442, 472, 482, 492) can be child nodes of the ternary tree query nodes (e.g., 420, 430, 440, 450, 460, 470, 480, 490) and the trie query nodes (e.g., 401, 402, 403). In various embodiments, the solution nodes (e.g., 442, 472, 482, 492) can be child nodes of a query node that can be reached by traversing tree data structure 400 based on a search query that matches the predictive query solution in the solution node (e.g., 442, 472, 482, 492). For example, traversing tree data structure 400 with a query of "table" would result in traversing through trie query node 401 for "t," trie query node 402 for "a," trie query node 403 for "b," ternary tree query node 420 for "l," and ternary tree query node 440 for "e." Solution node 442 includes a predictive query solution of "table." Similarly, traversing tree data structure 400 with a query of "tablet" would result in traversing through the same path, and traversing one step further to solution node 470, which includes a predictive query solution of "tablet." When a user types in a search query, and has entered "tabl," tree structure 400 can be used to determine that predictive query solutions can include "table" and "tablet." A determination of whether the predictive query solutions are included in the predictive search query recommendations send to the user can be based on the score associated with each of the predictive query solutions, which can be based on relevance, as described above.

In a number of embodiments, the solution nodes (e.g., 442, 472, 482, 492) can be child nodes of a query node, and can be reached by traversing tree data structure 400 based on a query that does not match the predictive query solution in the solution node (e.g. 442, 472, 482, 492), but that is otherwise pre-determined to be appropriately correlated with the predictive query solution based on auto-correction logic. For example, a query of "talbe" is a misspelling of "table." Solution node 480 can be arrived at in tree data structure 400 by traversing along a path for the query "talbe," and solution node can include a predictive query solution of "table." Similarly, a query node arrived at using a query of "jeans blue" can have a more conventional predictive query solution of "blue jeans" in the solution node attached to the query node. In conventional auto-completion systems, auto-correction of queries can occur as a process that is performed prior to the auto-completion process. In other words, the results of the auto-correction system can be fed into the auto-completion system. This two-step process can slow down the process of providing auto-completion suggestions. As described above, correction of search queries can be performed within the auto-complete system, which can decrease processing time, as the search query does not need to pass first through an auto-correction process.

In various embodiments, the query nodes, such as the trie query nodes (e.g., 401, 402, 403) and the ternary tree query nodes (e.g., 420, 430, 440, 450, 460, 470, 480, 490) of tree data structure 400 can include data to speed up the process of obtaining the predictive search query recommendations, such as by limiting the amount of tree data structure 400 that needs to be traversed. In some embodiments, the trie query nodes (e.g., 401, 402, 403) can include more data at each node than the ternary tree query nodes (e.g., 420, 430, 440, 450, 460, 470, 480, 490), as adding a lot of data at every query node can use a lot of memory, and having less data at each of the ternary tree query nodes (e.g., 420, 430, 440, 450, 460, 470, 480, 490) can decrease memory consumption.

In several embodiments, such as embodiments in which the solution nodes (e.g., 442, 472, 482, 492) are not child nodes of the trie query nodes (e.g., 401, 402, 403), the trie query nodes (e.g., 401, 402, 403) can include one or more results lists, such as results lists 411, 412, 413, and 414. In many embodiments, each indexed character of the trie query nodes (e.g., 401, 402, 403) can include a results list. The results lists (e.g., 411, 412, 413, 414) can include a list of predictive query solutions that have been predetermined to be the most relevant search suggestions for a particular query. For example, if a user enters a search query of "t," results list 411, which is associated with index "t" of query node 401, can include a list of top suggestions, such as "TV," "tablet," "trampoline," "tent," "treadmill," "tide," "toddler bed," "toilet paper," "towel," and "table," which can be returned to the user as predictive search query recommendations. Similarly, if a user enters a search query of "ta," results list 412, which is associated with index "a" of query node 401, along the query path "ta," can include a list of top suggestions, such as "tablet," "table," "tablet cases," "table lamp," "tarp," "table cloth," "tackle box," "tape," "tampon," and "tank top." By pre-computing the results lists (e.g., 411, 412, 413, 414), tree data structure 400 can rapidly return predictive search query recommendations for search queries that are short enough such that traversing tree data structure 400 to an ending-character query node matching the last character of the inputted search query results in an ending-character query node that includes the results list (e.g., 411, 412, 413, 414), such as one of the trie query nodes (e.g., 401, 402, 403).

In some embodiments, the ternary tree query nodes (e.g., 420, 430, 440, 450, 460, 470, 480, 490) can include data indicating a solution with the highest score that can be obtained by traversing down the branches in the subtree rooted at that ternary tree query node. This data can be used in a heuristic search to determine at each node which branch to traverse first in order to find the solution node with the highest score. In other words, each query node can include a subtree score, such as subtree scores 421, 431, 441, 451, 461, 471, 481, and 491, which can indicate the highest score in a solution node found in the subtree rooted by that query node. The data used for the subtree score (e.g., 421, 431, 441, 451, 461, 471, 481, 491) can be a limited amount of data that does not use a lot of memory.

For example, when a user types in "ipho," there can be, for example, 100 predictive query solutions, but auto-complete needs only to return the top 10 predictive query solutions. After traversing the query nodes through the letters i, p, h, and o, there are 100 solution nodes in an ending-character subtree rooted at an ending-character query node having the letter "o." To determine which child to traverse next in determining the top predictive query solutions, system 300 (FIG. 3) can simply look at the child node with the highest subtree score and branch to that child node. In many embodiments, the subtree score (e.g., 421, 431, 441, 451, 461, 471, 481, 491) of each ternary tree query node (e.g., 420, 430, 440, 450, 460, 470, 480, 490) will be the highest subtree score of the child nodes of the ternary tree query node. This process can be iterated to obtain the top predictive query solution (i.e., the predictive query solution with the highest score).

In the process of finding the top predictive query solution, other of the child ternary tree query nodes having the next-highest subtree scores also can be tracked, such that system 300 (FIG. 3) can rapidly determine which branch or branches of the ending-character subtree to traverse next in order to find the predictive query solution with the next-highest score. During the process of finding the next-highest predictive query solution, the list of other ternary tree query nodes having high subtree scores can be updated. After finding the next-highest predictive query solution, system 300 (FIG. 3) can similarly and/or iteratively find the next-highest predictive query solution from the updated list, and so forth.

In many embodiments, tree data structure 400 can be constructed and/or pre-computed, such as by computation server 300 (FIG. 3) prior to receiving a query from the user and performing query auto-completion. For example, the subtree scores (e.g., 421, 431, 441, 451, 461, 471, 481, 491) at each ternary tree query node (e.g., 420, 430, 440, 450, 460, 470, 480, 490) can be pre-computed prior to system 300 receiving a query from the user. The pre-computation process can occur once upon creating or updating tree data structure 400, and then tree data structure 400 can be used many times to rapidly return auto-completion solutions. In some embodiments, the results list (e.g., 411, 412, 413, 414) can be pre-computed and stored for some nodes, such as the trie query nodes (e.g., 401, 402, 403), and not for the ternary tree query nodes (e.g., 420, 430, 440, 450, 460, 470, 480, 490). In other embodiments, the results list (e.g., 411, 412, 413, 414) can be pre-computed for every query node. For query nodes in which the results list (e.g., 411, 412, 413, 414) is not included, the subtree score (e.g., 421, 431, 441, 451, 461, 471, 481, 491) can be included in those query nodes. The subtree score (e.g., 421, 431, 441, 451, 461, 471, 481, 491), which represents the score of solution node in the subtree having the highest score, can help system 300 to rapidly determine which branches of tree data structure 400 to traverse. Determining the predictive search query recommendations can be very fast with this approach.

Using the trie query nodes (e.g., 401, 402, 403) and the ternary tree query nodes (e.g., 420, 430, 440, 450, 460, 470, 480, 490) as described herein can beneficially avoid significant waste of memory, while still delivering rapid performance. The mix of storing the results lists (e.g., 411, 412, 413, 414) for certain query nodes and not storing the results lists (e.g., 411, 412, 413, 414) for most other query nodes can advantageously help optimize tree data structure 400 for performance and memory usage. By storing the score of the highest scoring solution node in the subtree score (e.g., 421, 431, 441, 451, 461, 471, 481, 491), retrieval of predictive search query recommendations can be very fast, even in large subtrees. Tree data structure 400 can advantageously be highly configurable and/or can be easily tuned for changes in performance and/or memory usage. In many embodiments, insertions of new solutions and/or ternary tree query nodes in in the tree data structure (e.g. 400) can be performed rapidly using the ternary tree structure of the ternary tree query nodes (e.g., 420, 430, 440, 450, 460, 470, 480, 490).

Figure 5:
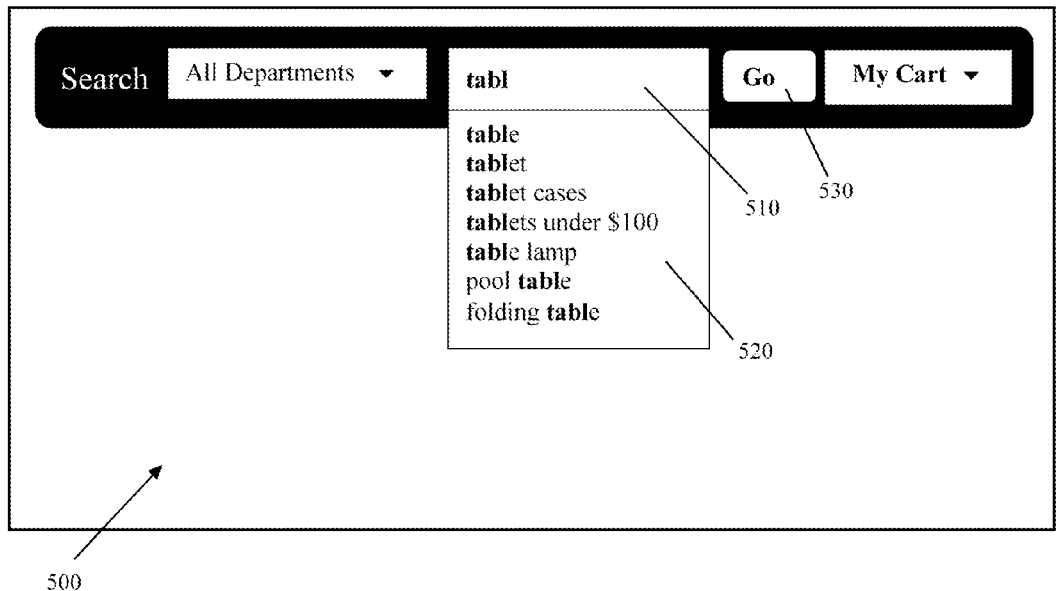
FIG. 5 illustrates an exemplary web page showing an exemplary usage of query auto-completion, according to another embodiment.

Turning ahead in the drawings, FIG. 5 illustrates an exemplary web page 500 showing an exemplary usage of query auto-completion, in accordance with various embodiments. Web page 500 is merely exemplary, and embodiments for providing query auto-completion can be employed in many different embodiments or examples not specifically depicted or described herein. In some embodiments, web server 320 (FIG. 3) can provide a web page, such as web page 500, to one or more of user computers (e.g., 340-344 (FIG. 3)), which can allow a user to enter a search query. For example, web page 500 can include a search box 510 in which the user can enter the search query. In various embodiments, web page 500 can display the search query in search box 510 as the user types in the search query. In many embodiments, web page 500 can include a display area 520 in which the predictive search query recommendations are displayed. In many embodiments, web page 500 can display the predictive search query recommendations in display area 520 as the user types a search query and/or before the user finishes typing a complete search query, which can be indicated by the user selecting a button 530, hitting the ENTER key on the user's keyboard, or another suitable method of indicating that the search query is complete.

For example, as shown in FIG. 5, a user can be in the process of typing "tablet cases," and can have typed the first four characters, prior to completing the search query, such that search box 510 displays a search query of "tabl." Web server 320 (FIG. 3) and/or computation server 310 (FIG. 3) can receive the search query, "tabl," and can determine the predictive search query recommendations using a tree data structure, such as tree data structure 400 (FIG. 4), as described herein. Web server 320 (FIG. 3) can send the predictive search query recommendations to the user, such as for display in display area 520. For example, as shown in FIG. 5, the predictive search query recommendations displayed in display area 520 can include "table," "tablet," "tablet cases," "tablets under $100," "table lamp," "pool table," and "folding table." The predictive search query recommendations can include relevant search queries that begin with "tabl," such as "table" or "tablet," and/or can include relevant search queries that include "tabl," such as "pool table" or "folding tablet" in which the search query is different than the prefix string of the predictive search query recommendation. The user can select one of the predictive search query recommendations in display area 520, such as by clicking on it, scrolling down to it, or another suitable selection method. As shown in FIG. 5, the user's typed letters "tabl" can be bolded or otherwise highlighted in display area 520.

Figure 6:
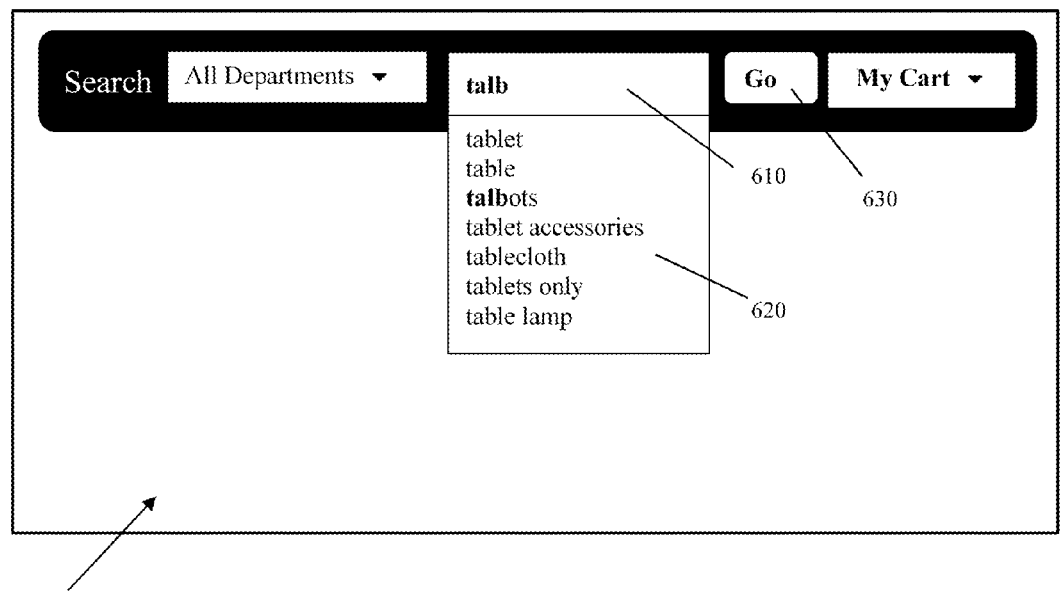
FIG. 6 illustrates an exemplary web page showing an exemplary usage of query auto-completion, according to another embodiment.

Turning ahead in the drawings, FIG. 6 illustrates an exemplary web page 600 showing an exemplary usage of query auto-completion, in accordance with various embodiments. Web page 600 is merely exemplary, and embodiments for providing query auto-completion can be employed in many different embodiments or examples not specifically depicted or described. In some embodiments, web server 320 (FIG. 3) can provide web page 600 to user computers (e.g., 340-344 (FIG. 3)). Web page 600 can be similar to web page 500 (FIG. 5), and various components of web page 600 can be identical or similar to various components of web page 500 (FIG. 5). Web page 600 can include a search box 610, a display area 620, and/or a button 630. Search box 610 can be identical or similar to search box 510 (FIG. 5), display area 620 can be identical or similar to display area 520, and/or button 630 can be identical or similar to button 530.

As shown in FIG. 6, a user can be in the process of typing "tablet cases," and can have mistyped the first four characters before typing the complete search query, such that search box 610 displays a search query of "talb." For example, the user could have accidently mistyped the spelling (a typographic error), or could have misunderstood the correct spelling (an orthographic error). Web server 320 (FIG. 3) and/or computation server 310 (FIG. 3) can receive the search query, "talb," and can determine the predictive search query recommendations using a tree data structure, such as tree data structure 400 (FIG. 4), as described herein. Web server 320 (FIG. 3) can send the predictive search query recommendations to the user, such as for display in display area 620. For example, as shown in FIG. 6, the predictive search query recommendations displayed in display area 620 can include one or more corrections of the typographic or orthographic error, such as "tablet," "table," "tablet accessories," "tablecloth," "tablets only," and "table lamp." The predictive search query recommendations displayed in display area 620 also can include one or more predictive search query recommendations that are not corrections of typographic or orthographic errors, such as "talbots." The user can select one of the predictive search query recommendations in display area 620, such as by clicking on it, scrolling down to it, or another suitable selection method. As shown in FIG. 6, the user's typed letters "talb" can be bolded or otherwise highlighted in display area 620.

Figure 7:
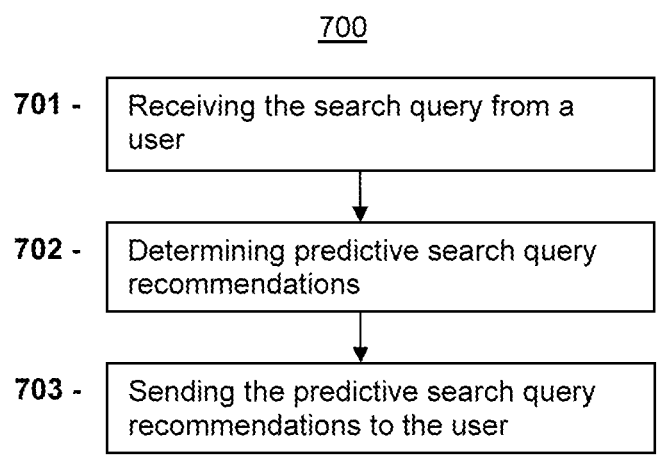
FIG. 7 illustrates a flow chart for a method of providing predictive search query recommendations for a search query, according to another embodiment.

Turning ahead in the drawings, FIG. 7 illustrates a flow chart for a method 700 of providing predictive search query recommendations for a search query, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In some embodiments, method 700 can be implemented by computation server 310 (FIG. 3) and/or web server 320 (FIG. 3).

Referring to FIG. 7, in some embodiments method 700 can include block 701 of receiving the search query from the user. In many embodiments, the search query can be input by the user on a user computer (e.g., 340-344 (FIG. 3)) in a search box in a web page, such as in search box 510 (FIG. 5) of web page 500 (FIG. 5) or in search box 610 (FIG. 6) of web page 600 (FIG. 6). The search query can be sent from one of the user computers (e.g., 340-344 (FIG. 3)) to web server 320 (FIG. 3). In some embodiments, the search query can be a partial search query that is not a complete search query. In other embodiments, the search query can be a complete search query. In a number of embodiments, the search query can be a partial search query received from the user prior to the user performing an action that indicates the user has entered a complete search query, such as selecting button 530 (FIG. 5) or button 630 (FIG. 6). The partial search query can be a portion of the complete search query. For example, the complete search query can be "tablet cases," and the partial search query can be "tabl." In various embodiments, the search query can include one or more typographic or orthographic errors.

In a number of embodiments, method 700 can include block 702 of determining predictive search query recommendation for the search query using a tree data structure. In many embodiments, web server 320 (FIG. 3) can determine predictive search query recommendations. The tree data structure can be identical or similar to tree data structure 400 (FIG. 4). In many embodiments, top layers of the tree data structure can include trie query nodes and/or bottom layers of the tree data structure can include ternary tree query nodes. The trie query nodes can be identical or similar to trie query nodes 401, 402, and/or 403 (FIG. 4). The ternary tree query nodes can be identical or similar to ternary tree query nodes 420, 430, 440, 450, 460, 470, 480, and/or 490 (FIG. 4). In some embodiments, the top layers of the tree data structure having the trie query nodes can be three to five layers at a top of the tree data structure. In other embodiments, the trie query nodes can be one to ten layers at the top of the tree data structure.

In several embodiments, the tree data structure can include query nodes and solution nodes. The query nodes can include the trie query nodes and the ternary tree query nodes. The solution nodes can be identical or similar to solution nodes 442, 472, 482, an/or 492 (FIG. 4). In many embodiments, each of the solution nodes can be a leaf node of the tree data structure, can be a child of a ternary tree query node, and/or can include a predictive query solution and a score. In a number of embodiments, each of the trie query nodes can include one or more results lists. The results list can be identical or similar to results lists 411, 412, 413, and/or 414 (FIG. 4). In various embodiments, each of the ternary tree query nodes can include a subtree score that is equal to a highest score of any of the solution nodes in a subtree that is rooted at the ternary tree query node. The subtree scores can be identical or similar to subtree scores 421, 431, 441, 451, 461, 471, 481, and/or 491 (FIG. 4). In a number of embodiments, the score of each of the solution nodes can be based on a relevance of the predictive query solution of the solution node.

In certain embodiments, the predictive search query recommendations can include one or more suggested queries that have a prefix string that is different than the search query. For example, web server 320 can determine upon receiving a search query of "jeans blue" that a predictive search query recommendations is "blue jeans."

In many embodiments, the tree data structure can be pre-computed prior to receiving a search query from a user. In some embodiments, computing server 310 (FIG. 3) can pre-compute the tree data structure. In a number of embodiments, the tree data structure can be pre-cached prior to receiving a search query from a user. For example, the tree data structure can be pre-cached in memory in web server 320 (FIG. 3), which can advantageously allow web server 320 (FIG. 3) to quickly determine predictive search query recommendations upon receiving a search query from a user.

In some embodiments, method 700 can include block 703 of sending the predictive search query recommendations to the user. In a number of embodiments, the predictive search query recommendations can be sent from web server 320 (FIG. 3) to a user computer (e.g., 340-344 (FIG. 3)) for display on a web page, such as web page 500 (FIG. 5) or web page 600 (FIG. 6). For example, web server 320 (FIG. 3) can encode for display the predictive search query recommendations, such as in display area 520 (FIG. 5) or display area 620 (FIG. 6). In various embodiments, the predictive search query recommendations sent to the user can include one or more corrections of one or more typographic or orthographic errors in the search query.

Figure 8:
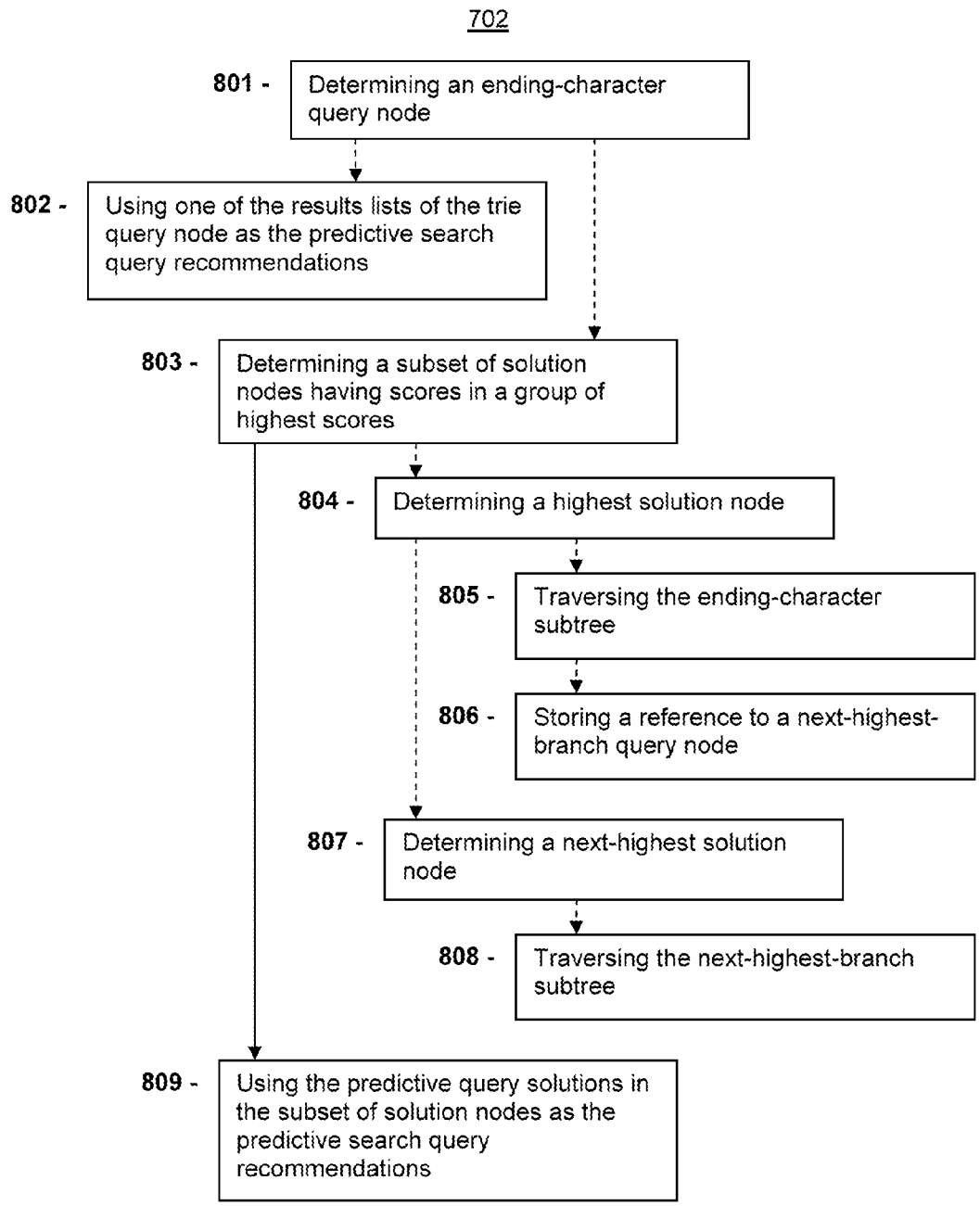
FIG. 8 illustrates a flow chart for an embodiment of block of determining the predictive search query recommendations using a tree data structure, according to the embodiment of FIG. 7.

Turning ahead in the drawings, FIG. 8 illustrates a flow chart for an embodiment of block 702 of determining the predictive search query recommendations. Block 702 is merely exemplary and is not limited to the embodiments presented herein. Block 702 can be employed in many different embodiments or examples not specifically depicted or described herein. In some embodiments, the procedures, the processes, and/or the activities of block 702 can be performed in the order presented. In other embodiments, the procedures, the processes, and/or the activities of block 702 can be performed in any suitable order. In still other embodiments, one or more of the procedures, the processes, and/or the activities of block 702 can be combined or skipped.

Referring to FIG. 8, in some embodiments block 702 of determining the predictive search query recommendations can include block 801 of determining an ending-character query node. In many embodiments, the ending-character query node can be determined from among the query nodes based on the search query. For example, as described above, the tree data structure can be traversed from a top-level root node through branching to child nodes on a path to the ending-character-query node, based upon the characters in the search query. In many embodiments, branching among the trie query nodes can be done through conventional trie query node searching techniques, and/or branching among the ternary tree query nodes can be done through conventional ternary tree query node searching techniques. For example, as shown in FIG. 4, for a search query of "tabl," tree data structure 400 (FIG. 4) can be traversed from trie query node 401 (FIG. 4) for "t," to trie query node 402 (FIG. 4) for "a," to trie query node 403 (FIG. 4) for "b," to ternary tree query node 420 for "1." As such, ternary tree query node 420 can be determined to be the ending-character query node for the search query "tabl."

In many embodiments, if the ending-character query node determined in block 801 is one of the trie query nodes, block 702 in FIG. 8 of determining the predictive search query recommendations can include block 802 of using one of the one or more results lists of the trie query nodes as the predictive search query recommendation. For example, if the search query is "ta," and the ending-character query node determined in block 801 is trie query node 402 (FIG. 4) in tree data structure 400 (FIG. 4), results list 412 can include a list of predictive query solutions that have been predetermined to be the most relevant search suggestions for the search query of "ta." These predictive query solutions in the results list can be used as the predictive search query recommendations.

In a number of embodiments, if the ending-character query node is one of the ternary tree query nodes, block 702 in FIG. 8 of determining the predictive search query recommendations can include block 803 of determining a subset of solution nodes having scores that are in a group of highest scores in any of the solution nodes that are in an ending-character subtree that is rooted at the ending-character query node. In various embodiments, the subset of solution nodes can be capped at a maximum number that can be displayed, such as in display area 520 (FIG. 5) or display area 620 (FIG. 6). Block 803 can be implemented in a variety of ways. For example, block 803 can include traversing the entire ending-character subtree to find the highest solution nodes. In another embodiment, block 803 can include using the subtree scores in the ternary tree query nodes to quickly find the highest solution nodes.

In some embodiments, block 803 of determining a subset of solution nodes can include a block 804 of determining a highest solution node from among the solution nodes in the ending-character subtree, such that the score of the highest solution node is higher than any other ones of the scores of the solution nodes in the ending-character subtree.

In various embodiments, block 804 of determining a highest solution node can include block 805 of traversing the ending-character subtree from the ending-character query node to the highest solution node by repeatedly branching from a parent query node of the query nodes to a top child query node of the query nodes. The subtree score of the top child query node can be equal to the subtree score of the parent query node. The subtree scores can be used to determine the top child and avoid branching down paths that do not include the highest solution node.

In a number of embodiments, block 804 of determining a highest solution node also can include a block 806 of storing a reference to a next-highest-branch query node. The next-highest-branch query node can be a child node of one of the query nodes traversed when determining the highest solution node. The subtree score of the next highest-branch-query node can be the next-highest score of the solution nodes (i.e., higher than any score other than the score of the highest solution node). For example, while traversing the ending-character subtree in block 805, one or more of the next-highest branch query nodes can be tracked, which can advantageously be used to determine in which subtree to find the next-highest score.

In many embodiments, block 803 of determining a subset of solution nodes can include, after block 804 of determining a highest solution node, a block 807 of determining a next-highest solution node from among a next-highest-branch subtree that is rooted at the next-highest-branch query node determined in block 806. In a number of embodiments, block 806 of storing a reference to a next-highest-branch query node and block 807 of determining a next-highest solution node can be iterated through to determine the entire subset of solution nodes having the highest scores.

In several embodiments, block 807 of determining a highest solution node can include a block 808 of traversing the next-highest-branch subtree from the next-highest-branch query node to the next-highest solution node by repeatedly branching from a parent query node of the query nodes to a top child query node of the query nodes, wherein the subtree score of the top child query node is equal to the subtree score of the next-highest-branch query node.

In many embodiments, if the ending-character query node is one of the ternary tree query nodes, block 702 of determining the predictive search query recommendations can include, after block 803 of determining a subset of solution nodes, a block 809 of using the predictive query solutions in the subset of solution nodes as the predictive search query recommendations.

Figure 9:
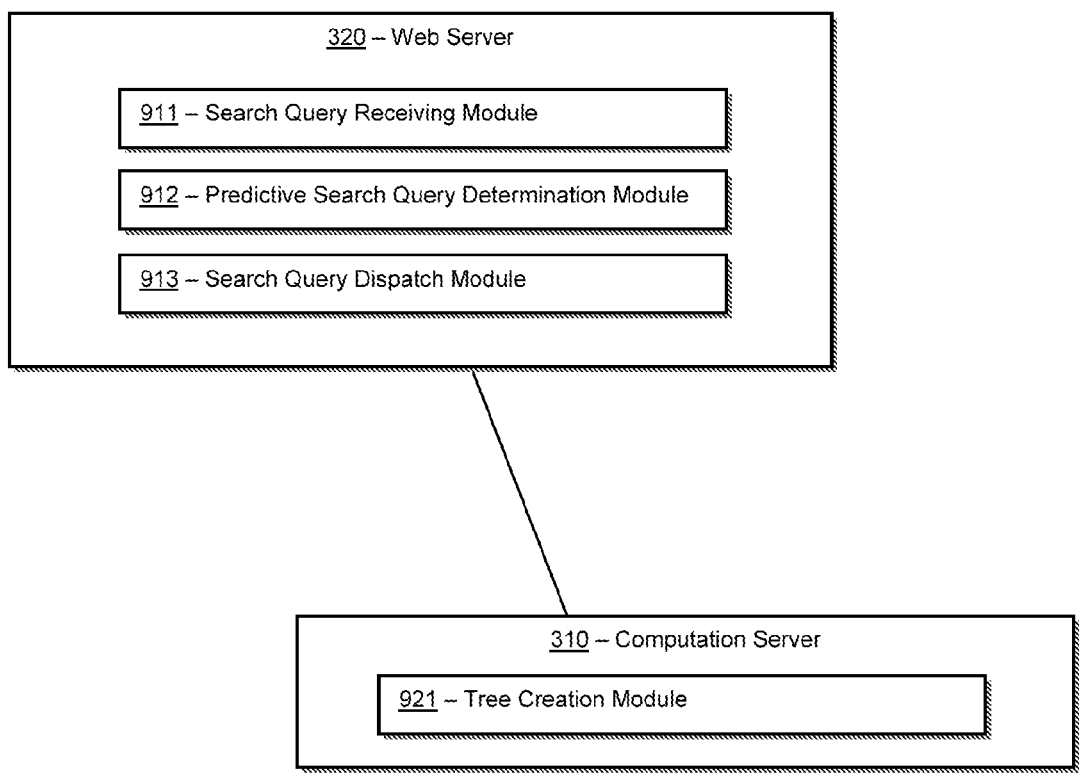
FIG. 9 illustrates a block diagram of an example of various components of the system, according to the embodiment of FIG. 3.

Turning ahead in the drawings, FIG. 9 illustrates another block diagram of system 300, according to the embodiment shown in FIG. 3. Computation server 310 and web server 320 are merely exemplary and are not limited to the embodiments presented herein. Computation server 310 and web server 320 can be employed in many different embodiments or examples not specifically depicted or described herein. In some embodiments, certain elements or modules of computation server 310 and/or web server 320 can perform various procedures, processes, and/or acts. In other embodiments, the procedures, processes, and/or acts can be performed by other suitable elements or modules.

In a number of embodiments, computation server 310 can include a tree creation module 921. In certain embodiments, tree creation module 921 can pre-compute the tree data structure, such as tree data structure 400 (FIG. 4). For example, the tree data structure can be created based on queries associated with the predictive query solutions, which can be the same as the predictive query solutions, misspellings of the predictive query solutions, or otherwise correlated with the predictive query solutions, as described above. The subtree scores (e.g., 421, 431, 441, 451, 461, 471, 481, 491 (FIG. 4)) at each ternary tree query node (e.g., 420, 430, 440, 450, 460, 470, 480, 490 (FIG. 4)) can be pre-computed prior to web server 320 receiving a query from the user. The pre-computation process can occur once upon creating or updating tree data structure 400 (FIG. 4), and then tree data structure 400 (FIG. 4) can be loaded into web server 320 and used many times for query auto-completion. In some embodiments, the results lists (e.g., 411, 412, 413, 414 (FIG. 4)) can be pre-computed and stored in the trie query nodes.

In many embodiments, web server 320 can include search query receiving module 911. In certain embodiments, search query receiving module 911 can perform block 701 (FIG. 7) of receiving the search query from a user. In various embodiments, web server 320 can include predictive search query determination module 912. In certain embodiments, predictive search query determination module 912 can perform block 702 (FIG. 7) of determining predictive search query recommendation, and one or more of blocks 801-807 (FIG. 8). In many embodiments, web server 320 can include a search query dispatch module 913. In certain embodiments, search query dispatch module 913 can perform block 703 (FIG. 7) of sending the predictive search query recommendations to the user.

Although query auto-completion has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 7-8 may include different procedures, processes, and/or activities and be performed by many different modules, in many different orders. As another example, the modules within computation server 310 and web server 320 in FIG. 9 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of providing predictive search query recommendations for a search query, the method being implemented via execution of computer instructions configured to run at one or more processing modules and configured to be stored at one or more non-transitory memory storage modules, the method comprising:
  receiving the search query from a user;
  determining the predictive search query recommendations for the search query using a tree data structure, wherein at least one top layer of the tree data structure comprise at least one trie query node, and wherein bottom layers of the tree data structure comprise ternary tree query nodes; and
  sending the predictive search query recommendations to the user,
  wherein:
    the at least one top layer of the tree data structure having the at least one trie query node are at least three layers at a top of the tree data structure;
    the tree data structure comprises query nodes and solution nodes;
    the query nodes comprise the at least one trie query node and the ternary tree query nodes;
    each of the solution nodes is a leaf node of the tree data structure, is a child of a ternary tree query node within the ternary tree query nodes, and comprises a predictive query solution and a score;
    each of the ternary tree query nodes comprises a subtree score that is equal to a highest score of any of the solution nodes in a subtree that is rooted at the ternary tree query node; and
    determining the predictive search query recommendations comprises:
      determining an ending-character query node from among the query nodes based on the search query; and
      if the ending-character query node is one of the ternary tree query nodes:
        determining a subset of the solution nodes having scores that are in a group of highest scores in any of the solution nodes that are in an ending-character subtree that is rooted at the ending-character query node; and
        using the predictive query solutions of the solution nodes in the subset of the solution nodes as the predictive search query recommendations.

2. The method of claim 1, wherein:
  receiving the search query from the user comprises:
    receiving a partial search query from the user prior to the user performing an action indicating entry of a complete search query that includes the partial search query.

3. The method of claim 1, wherein:
the predictive search query recommendations include one or more suggested queries that have a prefix string that is different than the search query.

4. The method of claim 1, wherein:
receiving the search query from the user comprises receiving the search query from the user such that the search query includes one or more typographic or orthographic errors; and
sending the predictive search query recommendations to the user comprises sending the predictive search query recommendations to the user such that the predictive search query recommendations include one or more corrections of the one or more typographic or orthographic errors.

5. The method of claim 1, wherein:
the at least one top layer of the tree data structure having the at least one trie query node are three to five layers at the top of the tree data structure.

6. The method of claim 1, wherein:
each of the at least one trie query node comprises one or more results lists;
and
determining the predictive search query recommendations further comprises:
if the ending-character query node is one of the at least one trie query node, using one of the one or more results lists of the one of the at least one trie query node as the predictive search query recommendations.

7. The method of claim 1, wherein:
determining the subset of the solution nodes comprises:
determining a highest solution node from among the solution nodes in the ending-character subtree, such that the score of the highest solution node is higher than any other of the scores of the solution nodes in the ending-character subtree.

8. The method of claim 7, wherein:
determining the highest solution node comprises:
traversing the ending-character subtree from the ending-character query node to the highest solution node by repeatedly branching from a parent query node of the query nodes to a top child query node of the query nodes, wherein the subtree score of the top child query node is equal to the subtree score of the parent query node.

9. The method of claim 7, wherein:
determining the highest solution node comprises:
storing a reference to a next-highest-branch query node of the query nodes, wherein the next-highest-branch query node is a query node of the query nodes in the ending-character subtree, the next-highest-branch query node is a child node of one of the query nodes traversed when determining the highest solution node, and the subtree score of the next-highest-branch query node is a next-highest score than the score of the highest solution node; and
determining the subset of the solution nodes comprises:
determining a next-highest solution node of the solution nodes from among a next-highest-branch subtree that is rooted at the next-highest-branch query node.

10. The method of claim 9, wherein:
determining the next-highest solution node comprises:
traversing the next-highest-branch subtree from the next-highest-branch query node to the next-highest solution node by repeatedly branching from a parent query node of the query nodes to a top child query node of the query nodes, wherein the subtree score of the top child query node is equal to the subtree score of the next-highest-branch query node.

11. The method of claim 1, wherein:
the score of each of the solution nodes is based on a relevance of the predictive query solution of the solution node.

12. The method of claim 1, wherein:
the tree data structure is pre-computed prior to receiving the search query from the user.

13. The method of claim 1, wherein:
the tree data structure is pre-cached prior to receiving the search query from the user.

14. A system for providing predictive search query recommendations for a search query, the system comprising:
one or more processing modules; and
one or more non-transitory memory storage modules storing computing instructions configured to run on the one or more processing modules and perform:
receiving the search query from a user;
determining the predictive search query recommendations for the search query using a tree data structure, wherein at least one top layer of the tree data structure comprise at least one trie query node, and wherein bottom layers of the tree data structure comprise ternary tree query nodes; and
sending the predictive search query recommendations to the user,
wherein:
the at least one top layer of the tree data structure having the at least one trie query node are at least three layers at a top of the tree data structure;
the tree data structure comprises query nodes and solution nodes;
the query nodes comprise the at least one trie query node and the ternary tree query nodes;
each of the solution nodes is a leaf node of the tree data structure, is a child of a ternary tree query node within the ternary tree query nodes, and comprises a predictive query solution and a score;
each of the ternary tree query nodes comprises a subtree score that is equal to a highest score of any of the solution nodes in a subtree that is rooted at the ternary tree query node; and
determining the predictive search query recommendations comprises:
determining an ending-character query node from among the query nodes based on the search query; and
if the ending-character query node is one of the ternary tree query nodes:
determining a subset of the solution nodes having scores that are in a group of highest scores in any of the solution nodes that are in an ending-character subtree that is rooted at the ending-character query node; and
using the predictive query solutions of the solution nodes in the subset of the solution nodes as the predictive search query recommendations.

15. The system of claim 14, wherein the computing instructions are further configured such that:

receiving the search query from the user comprises receiving the search query from the user such that the search query includes one or more typographic or orthographic errors; and sending the predictive search query recommendations to the user comprises sending the predictive search query recommendations to the user such that the predictive search query recommendations include corrections of the typographic or orthographic errors.

16. The system of claim 14, wherein the computing instructions are further configured such that:

each of the at least one trie query node comprises one or more results lists; and determining the predictive search query recommendations further comprises:

if the ending-character query node is one of the at least one trie query node, using one of the one or more results lists of the one of the at least one trie query node as the predictive search query recommendations.

17. The system of claim 14, wherein the computing instructions are further configured such that:

determining the subset of the solution nodes comprises:

determining a highest solution node from among the solution nodes in the ending-character subtree, wherein the score of the highest solution node is higher than any other of the scores of the solution nodes in the ending-character subtree.

18. The system of claim 17, wherein the computing instructions are further configured such that:

determining the highest solution node comprises:

traversing the ending-character subtree from the ending-character query node to the highest solution node by repeatedly branching from a parent query node of the query nodes to a top child query node of the query nodes, wherein the subtree score of the top child query node is equal to the subtree score of the parent query node.

19. The system of claim 17, wherein the computing instructions are further configured such that:

determining the highest solution node comprises:

storing a reference to a next-highest-branch query node of the query nodes, wherein the next-highest-branch query node is a query node of the query nodes in the ending-character subtree, the next-highest-branch query node is a child node of one of the query nodes traversed when determining the highest solution node, and the subtree score of the next-highest-branch query node is a next-highest score than the score of the highest solution node; and determining the subset of the solution nodes comprises:

determining a next-highest solution node of the solution nodes from among a next-highest-branch subtree that is rooted at the next-highest-branch query node.

20. The system of claim 19, wherein the computing instructions are further configured such that:

determining the next-highest solution node comprises:

traversing the next-highest-branch subtree from the next-highest-branch query node to the next-highest solution node by repeatedly branching from a parent query node of the query nodes to a top child query node of the query nodes, wherein the subtree score of the top child query node is equal to the subtree score of the next-highest-branch query node.

* * * * *